US011064797B2

(12) United States Patent
Gilbert (10) Patent No.: US 11,064,797 B2
(45) Date of Patent: Jul. 20, 2021

(54) MOBILE DEVICE HOLDER

(71) Applicant: David S. Gilbert, Bristow, VA (US)

(72) Inventor: David S. Gilbert, Bristow, VA (US)

(73) Assignee: VuWing Corp, Bristow, VA (US)

( * ) Notice: Subject to any disclaimer, the term of this patent is extended or adjusted under 35 U.S.C. 154(b) by 0 days.

(21) Appl. No.: 16/444,568

(22) Filed: Jun. 18, 2019

(65) Prior Publication Data
US 2020/0085176 A1 Mar. 19, 2020

Related U.S. Application Data

(60) Provisional application No. 62/686,635, filed on Jun. 18, 2018.

(51) Int. Cl.
*A45F 5/10* (2006.01)
*H04B 1/3888* (2015.01)

(52) U.S. Cl.
CPC ............ *A45F 5/10* (2013.01); *H04B 1/3888* (2013.01); *A45F 2005/1086* (2013.01); *A45F 2200/0516* (2013.01); *A45F 2200/0525* (2013.01)

(58) Field of Classification Search
CPC ............... H04B 1/3888; H04B 1/3877; A45F 2005/1086; A45F 2200/0525; A45F 2200/0516; A45F 5/10; A45F 2005/1006
See application file for complete search history.

(56) References Cited

U.S. PATENT DOCUMENTS

| | | | |
|---|---|---|---|
| 9,813,533 B1 | 11/2017 | Ye | |
| 9,819,377 B1 | 11/2017 | Singh et al. | |
| 9,859,940 B1 | 1/2018 | Lundsgaard et al. | |
| 2009/0060473 A1 | 3/2009 | Kohte et al. | |
| 2010/0072334 A1 | 3/2010 | Le Gette et al. | |
| 2010/0078536 A1 | 4/2010 | Galvin | |
| 2010/0320341 A1* | 12/2010 | Baumann | F16B 47/006 248/206.2 |
| 2012/0037673 A1* | 2/2012 | Chen | A45C 11/00 224/191 |
| 2012/0267406 A1* | 10/2012 | Fan | B60R 11/02 224/482 |

(Continued)

OTHER PUBLICATIONS

Amazon.com_IPow, "IPOW Long Arm Universal Magnetic Cradle", Jun. 9, 2017, https://www.amazon.com/dp/B0721B4TW4/ref=sspa_dk_detail_6?psc=1&pd_rd_i=B0721B4TW4&pd_rd_w=2hRSe&pf_rd_p=48d372c1-f7e1-4b8b-9d02-4bd86f5158c5&pd_rd_wg=9hTbr&pf_rd_r=Y91TERJA3KATCGVDSXVH&pd_rd_r=d345d7dd-783a-4b15-b0c0-795485b444c1&spLa.*

(Continued)

*Primary Examiner* — Stephen A Vu
(74) *Attorney, Agent, or Firm* — IP Law Leaders PLLC (57) ABSTRACT

An apparatus for holding a mobile device stationary within a storage region of a medium of transportation, such as the pocket of a commercial airline, includes a plurality of regions. Deformable regions of the apparatus and corresponding flaps permit a user to bend the regions to an open position, place the mobile device within the flaps, and the deformation in a reverse direction serves to snugly fit and hold the mobile device in-place. In other variations, a magnetic holder, tacky surfaces and other implementations serve to hold the mobile device in-place. In numerous designs, extensive features are provided to hold the mobile device within a pocket or other compartment of a transport vehicle. Numerous materials and combinations of materials serve to permit these implementations.

18 Claims, 7 Drawing Sheets

(56) References Cited

U.S. PATENT DOCUMENTS

| | | | | |
|---|---|---|---|---|
| 2014/0145051 A1* | 5/2014 | Gwag | ................ | F16M 11/2092 |
| | | | | 248/298.1 |
| 2014/0176062 A1* | 6/2014 | Jung | ....................... | H02J 50/90 |
| | | | | 320/108 |
| 2015/0195392 A1 | 7/2015 | Nissenbaum | | |
| 2018/0046422 A1 | 2/2018 | Zenoff | | |

OTHER PUBLICATIONS

Amazon.com_iOttie, "iOttie Easy One Touch 4 Dash & Windshield Car Mount Phone", Oct. 9, 2017, https://www.amazon.com/iOttie-Dashboard-Windshield-Samsung-Smartphone/dp/B076B27WP6/ref=psdc_2230642011_t1_B07R1QZ8V1.*

Amazon.com_Macally, "Macally Adjustable Automobile Cup Holder Phone Mount", Mar. 3, 2012, https://www.amazon.com/Macally-Adjustable-Automobile-Smartphone-MCUPMP/dp/B007GNNH3Q/ref=psdc_2230642011_t1_B01KZ45VF4.*

CN202923892U.

* cited by examiner

MOBILE DEVICE HOLDER

CROSS-REFERENCE TO RELATED APPLICATIONS

This application claims the benefit of priority from U.S. Prov. Pat. Appl. No. 62/686,635, filed Jun. 18, 2018, the entire contents of which are incorporated herein by reference.

TECHNICAL FIELD

The embodiments described herein relate generally to holding apparatus systems and associated methods, and more specifically to systems for holding a mobile cell phone, tablet or other mobile device or accessory capable of functioning in a medium of transportation.

BACKGROUND

In an era of smart phones and big data, it is not an exaggeration that mobile devices have and continue to impact human progress the world over. It is estimated that 79% of people between the ages of 18 and 44 the world over have their mobile devices within reach 22 hours of the 24 hour day. As the mobile has become an extension of a person's hands and very thoughts, it has become not only a digital echo reflecting social behavior but a very creator of social behavior and norms. Every facet of behavior is affected at an ever-expanding pace of technological progress as big data analytics drives automation, increased communications brings individuals and organizations together for economic and social profit, and increased human mobility is preferred and increasingly required in all such endeavors.

As individuals spend greater and greater amounts of their time in transport, often on mass transportation means such as commercial airlines, their mobile devices continue to become their main instrument for work, entertainment and overall enrichment. Studies have established, however, as justified by massive anecdotal evidence, that it is not only inconvenient to hold the mobile device for extended periods, it is also not conducive to proper ergonomics as much of the working day is spent in transport. It is particularly noteworthy that the tilt of the head during long hours of mobile interaction are also injurious to the cervical spine and orthopedic health generally. What is needed are convenient, cost-efficient, easily configured means, and associated methods, for holding such a mobile device on a means for transportation.

SUMMARY

An object of the embodiments is to substantially solve at least the problems and/or disadvantages discussed above, and to provide at least one or more of the advantages described below. These objects are addressed in the specific embodiments detailed below.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

In an exemplary embodiment, a mobile device holding means for holding a mobile device on a mode of transportation includes: a frame including a first end and a second end; the first end including securing means for maintaining the mobile device in a substantially stationary position with respect to the mode of transportation; the second end including a mobile device fastening means, the mobile device fastening means including: a first element including a first portion of the second end; a second element including a second portion of the second end; and an attachment element including an area of contact between the first element and the second element, wherein the attachment element is disposed to permit placement of a mobile device between the first element and the second element, and is further disposed to permit the mobile device to be held in a substantially locked position between the first element and the second element.

The mode of transportation may include a pocket of a seat thereon disposed to hold written documents, wherein the securing means contacts the pocket. The securing means may include at least one of: a substantially elongated structure of the first end; a tacky coating on an external surface of the first end; a raised portion of the first end; and an arched portion of at least one of the first end and the second end. The mode of transportation may include at least one of: a powered flying vehicle; a powered railroad vehicle; and a powered road vehicle.

The mobile device fastening means can further include: a magnetic element disposed to magnetically couple any one of the first element and the second element to one or more pieces of metal associated with the mobile device. Also, at least one of the first element, the second element and the attachment element may be made up of a material including at least in part a polymer, the polymer including at least one of: Silicones; Polysiloxanes; and Thermoplastic Elastomers.

Furthermore, at least one of the first element, the second element and the attachment element can be made up of a material including at least in part a plastic, the plastic including at least one of: Polyethylene terephthalate (PETE, PET); Polyethylene (PE); Polyvinyl Chloride (PVC); Polypropylene (PP); Polystyrene; Polylactic Acid (PLA); Polycarbonate (PC); Acrylic (PMMC); Acetal (polyoxymethylene, POM); Nylon (PA); and Acrylonotrile Butadiene Styrene.

Also, the mobile device may be any one of: a cell phone; a smartphone; a tablet; and a mobile accessory device.

In other exemplary embodiments, the mobile device includes additional and/or alternative features or functions. Here, a mobile device holder is provided for holding a mobile device in a mode of transportation. It includes: an elongated body including a proximate portion and a distal portion opposite to the proximate portion. The distal portion may be connected to the elongated body at a part of it that is distal to a holding portion. The distal portion may be enabled to snugly fit in a pocket of the mode of transportation. The proximate portion may be connected to the elongated body at a part of it that is proximate to the holding portion. The holding portion can include: a first deformable region being disposed to hold a first side of the mobile device; and a second deformable region being disposed to hold a second side of the mobile device, wherein upon deformation of any one of the first and second deformable regions from the other of the first and second deformable regions to permit sufficient room for holding of the mobile device in-place, the first and second deformable regions are disposed to deform back to their original respective forms sufficiently to snugly fit the mobile device in-place at the first and second sides of the mobile device.

In an exemplary embodiment, the distal portion includes at least one of: a substantially elongated structure thereof; a tacky coating on an external surface thereof; a raised portion thereof; and an arched portion of at least one of the distal portion and the proximate portion. Also, the holding portion may further include means for housing a magnetic element disposed to magnetically couple any one of the first deformable region and the second deformable region to one or more pieces of metal associated with the mobile device. The associated mode of transportation can include at least one of: a powered flying vehicle; a powered railroad vehicle; and a powered road vehicle, and wherein the pocket is attached to a seat thereon and disposed to hold written materials.

In an exemplary embodiment, at least one of the first deformable region and the second deformable region is made up of a material including at least in part a polymer, the polymer including at least one of: Silicones; Polysiloxanes; and Thermoplastic Elastomers.

Also, at least one of the first deformable region and the second deformable region can be made up of a material including at least in part a plastic, the plastic including at least one of: Polyethylene terephthalate (PETE, PET); Polyethylene (PE); Polyvinyl Chloride (PVC); Polypropylene (PP); Polystyrene; Polylactic Acid (PLA); Polycarbonate (PC); Acrylic (PMMC); Acetal (polyoxymethylene, POM); Nylon (PA); and Acrylonotrile Butadiene Styrene.

The mobile device may also be any one of: a cell phone; a smartphone; a tablet; and a mobile accessory device.

In additional embodiments, an apparatus is provided for holding a mobile device stationary within a pocket affixed to one or more elements of a mode of transportation. The apparatus may include: a holding portion embodied to fasten the apparatus to the mobile device in a substantially fixed fashion; and an extended portion disposed to fasten the apparatus to the storage region in a substantially fixed fashion. The extended portion may be disposed to enable the mobile device to snugly fit in the pocket. In an embodiment, the holding portion includes: a first deformable region being disposed to hold a first side of the mobile device; and a second deformable region being disposed to hold a second side of the mobile device, wherein upon deformation of any one of the first and second deformable regions from the other of the first and second deformable regions to permit sufficient room for holding of the mobile device in-place, the first and second deformable regions are disposed to deform back to their original respective forms sufficiently to snugly fit the mobile device in-place at the first and second sides of the mobile device.

The holding portion may be further disposed to contain a magnetic element disposed to magnetically couple any one of the first deformable region and the second deformable region to one or more pieces of metal associated with the mobile device. Also, in certain embodiments, the extended portion includes at least one of: a substantially elongated structure thereof; a tacky coating on an external surface thereof; a raised portion thereof; and an arched portion of at least one of the holding portion and the extended portion.

BRIEF DESCRIPTION OF THE DRAWINGS

The above and other objects and features of the embodiments will become apparent and more readily appreciated from the following description of the embodiments with reference to the following Figures, wherein like reference numerals refer to like parts throughout the various Figures unless otherwise specified, and wherein.

DETAILED DESCRIPTION

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments can, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims.

The following embodiments are discussed, for simplicity, in regard to the terminology and structure generally for a holding apparatus and systems, and associated methods, and more specifically to apparatus, systems, and accompanying methods, for holding a mobile device. The mobile device includes without limitation a cell phone, a smartphone, a tablet and/or any other mobile accessory that is capable of functioning in a medium of transportation. The medium of transportation includes without limitation a commercial or private airline, train, bus, ship, boat, any other mass transit vehicle, and private non-mass transit vehicle such as an automobile.

In certain descriptions hereinbelow, the particular transportation vehicle described is a commercial airline. However, the embodiments set forth hereinbelow are not limited to the commercial airline, or any other of the aforementioned transportation vehicles. The systems and methods are also applicable to any number of other technology fields as recognized by skilled artisans.

In addition, reference throughout the specification to "one embodiment" or "an embodiment" means that a particular feature, structure, or characteristic described in connection with an embodiment is included in at least one embodiment of the embodiments. Thus, the appearance of the phrases "in one embodiment" or "in an embodiment" in various places throughout the specification is not necessarily referring to the same embodiment. Further, the particular feature, structures, or characteristics can be combined in any suitable manner in one or more embodiments.

Further still, it should be apparent to those of skill in the art that while certain items in the drawings may be been denoted "top," "bottom," "left side," "right side," "proximal," "proximal end," "distal," "distal end," and the like, such spatial indicators are or can be arbitrary, and are done for the purposes of making it easier for the reader to understand and visualize the aspects of the embodiments and are not to be construed in a limiting manner.

The present embodiments address the frequent and often tremendous inconvenience of holding a mobile device whether seated or standing on an aforementioned mode of transportation, such as a commercial airline. As mobile devices have and continue to increase in functionality, they provide the preferred and oft necessary features required for modern work performance and overall comfort.

As more and more often many working professionals spend increased amounts of their working hours on modes of transportation, overall ergonomics related to efficiency and comfort are required and benefitted by the present embodiments. In addition to comfort, issues related to spine health and orthopedic health are also addressed.

For instance, in addition to the strain and inconvenience to a person's arm and hands in holding the mobile device, cervical spine strain and injury are notable in studies conducted. It has been found that as the human head tilts forward, additional forces are significantly increased on the neck. A human head, while in a healthy, neutral position, generates forces to the cervical spine at about 10-12 pounds, but at a 15 degree tilt of the head, the force increases to about 27 pounds, at a 30 degree tilt increases to about 40 pounds, at a 45 degree tilt increases to 49 pounds, and at a 60 degree tilt increases to about 60 pounds. These types of increases in stress on the neck, in prolonged and ever frequent periods, may lead to numerous problems with the cervical spine and other orthopedics-related issues, including premature wear and tear, disc degeneration, stenosis (narrowing of spaces within the spine) and other health related problems.

Figure 1:
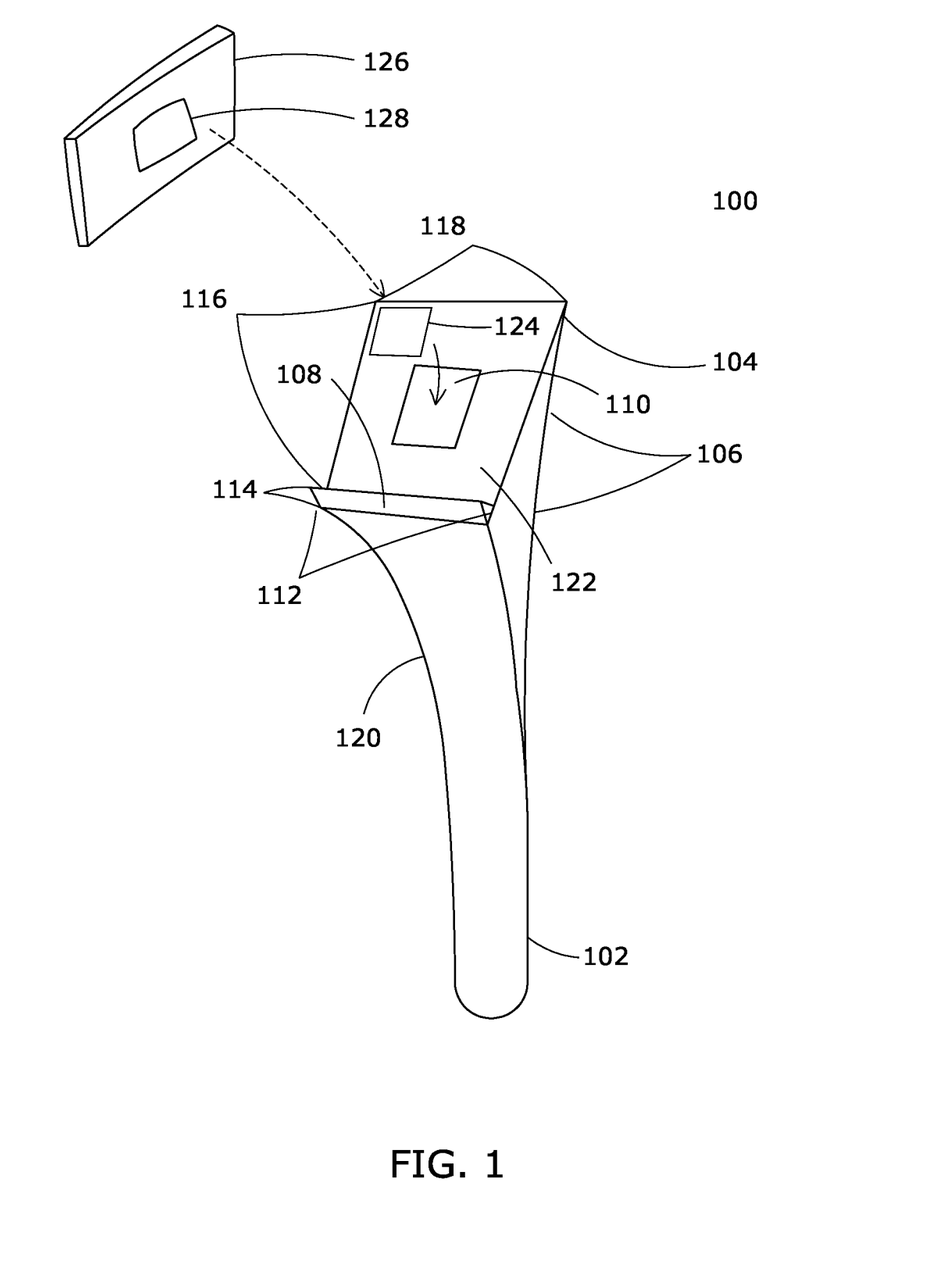
FIG. 1 illustrates first series of embodiments 100 of a mobile device holder.

FIG. 1 is an illustration of a first embodiment 100 of a mobile device holder 102. In the illustrated example of this embodiment 100, a "magnetic attach" type of design, mobile device holder 102 includes face region 122, back arch region 106, front arch region 120, ridge portion 108 and embedded magnet holder 110.

Figure 7:
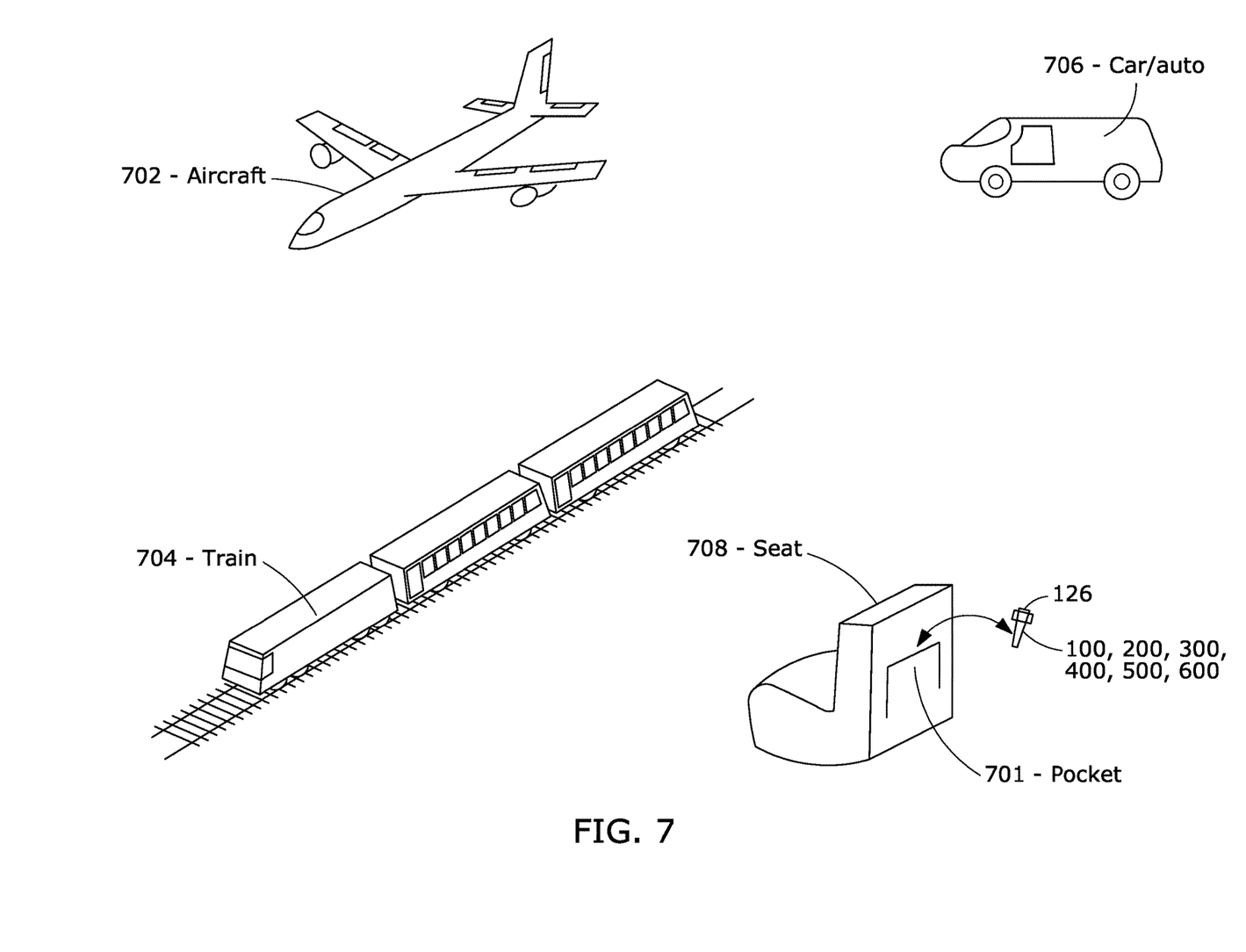
FIG. 7 illustrates use of the different aspects of the embodiments in several different modes of transportation, including that of an airplane, automobile, and train.

In certain exemplary embodiments, mobile device holder 102 comprises a single piece of deformable, or non-deformable, material. In certain embodiments, mobile device holder 102 is suited for one or more pockets, as shown in FIG. 7 (which shows a pocket in a seat used in several different modes of transportation including, but not limited to, an airplane, a train, and an automobile), such pockets facing the traveler and meant to hold magazines and other materials, though as mentioned the mobile device holders 102 of the present embodiments are capable of being employed with numerous means or modes of transportation, which have differing types of pockets or regions.

In operation, back arch region 106 provides resistance as against a back portion of the pocket to keep holder 102 upright and immobile. Front arch region 120 serves to provide resistance as against a front portion of the pocket to keep the device in-place, upright and immobile. The greater arch of front arch region 120 combined with ridge portion 108 serves to keep the holder 102 at least partially and firmly inside the pocket, while maintaining the mobile device itself (not shown) outside of the pocket. In certain embodiments, holder 102 is made of a deformable material, permitting the traveler to straighten holder 102 to reduce the arch of back arch region 106 in order to fit holder 102 in a tight pocket, and once in the pocket, holder 102 deforms back to its original shape (i.e., with greater arch in back arch region 106) so as to fit tightly in the pocket.

As shown in the illustrated embodiment, face region 122 is a flat region, disposed to interface with the back of the mobile device. The lengthwise dimension of face 122 is labeled 116, whereas the widthwise dimension of face 122 is labeled 118. Ridge portion 108 includes an elongated segment 114, protruding sufficient outward in thickness, to permit the mobile device to rest against it in an immobilized fashion in a side-to-side direction of holder 102.

Further immobility is provided by an embedded magnet (not shown). Face region 122 includes an embedded magnet holder 110. In certain embodiments, embedded magnet holder 110 is a recessed region of holder 102, designed to house an embedded magnet in an immobilized manner. In this embodiment, a piece of metal is either attached to the back of the mobile device, itself, or included as part of or inside a case housing the mobile device. The magnetic attraction as between this metal and the embedded magnet housed in embedded magnet holder 110 keeps the mobile device immobile, as it concurrently rests on ridge 108.

In alternative embodiments, the size of mobile device holder 102 differs based on the specific implementation. In exemplary implementations, the measurements of mobile device holder 102 depends upon the modes/means of transportation, and the relevant means (i.e., such as a pocket) wherein holder 102 is housed. In exemplary implementations, the measurements of mobile device holder 102 are designed based on size of the mobile device being held. For example, the measurements of a cell phone differ from that of a tablet, and mobile holder 102 is designed based on such specific implementation. In an exemplary embodiment, wherein holder 102 is designed to hold a cell phone on a commercial airline, elongated segment 114 is approximately 2.5 inches in length and approximately ⅜ of an inch in thickness, lengthwise dimension 116 is approximately 2.5 inches in length, and widthwise dimension 118 is approximately 3 inches in length.

In differing embodiments, the material comprising mobile device holder 102 includes deformable or alternatively non-deformable, and either naturally occurring or synthetically produced materials, in any combination of the foregoing. In exemplary embodiments, the material is heat-resistant and/or has varying degrees of firmness, including being of rubber-like quality. Exemplary implementations include polymers, such as Silicones, or Polysiloxanes. Plastics are used in varying embodiments, including without limitation Polyethylene terephthalate (PETE, PET), Polyethylene (PE), Polyvinyl Chloride (PVC), Polypropylene (PP), Polystyrene, Polylactic Acid (PLA), Polycarbonate (PC), Acrylic (PMMC), Acetal (polyoxymethylene, POM), Nylon (PA), Acrylonotrile butadiene styrene).

In addition, in alternative embodiments, the material and/or surface of the holder 102 are designed to increase the snugness of fit of the holder 102 within the pocket. In certain embodiments, a strip of material, including a tacky material, a Silicone material and other materials, are placed on back arch region 106 and/or front arch region 120. In certain embodiments, the face of these regions is treated to make them coarse or in another manner to promote snugness and reduce slippage of holder 120 inside the pocket.

Figure 2:
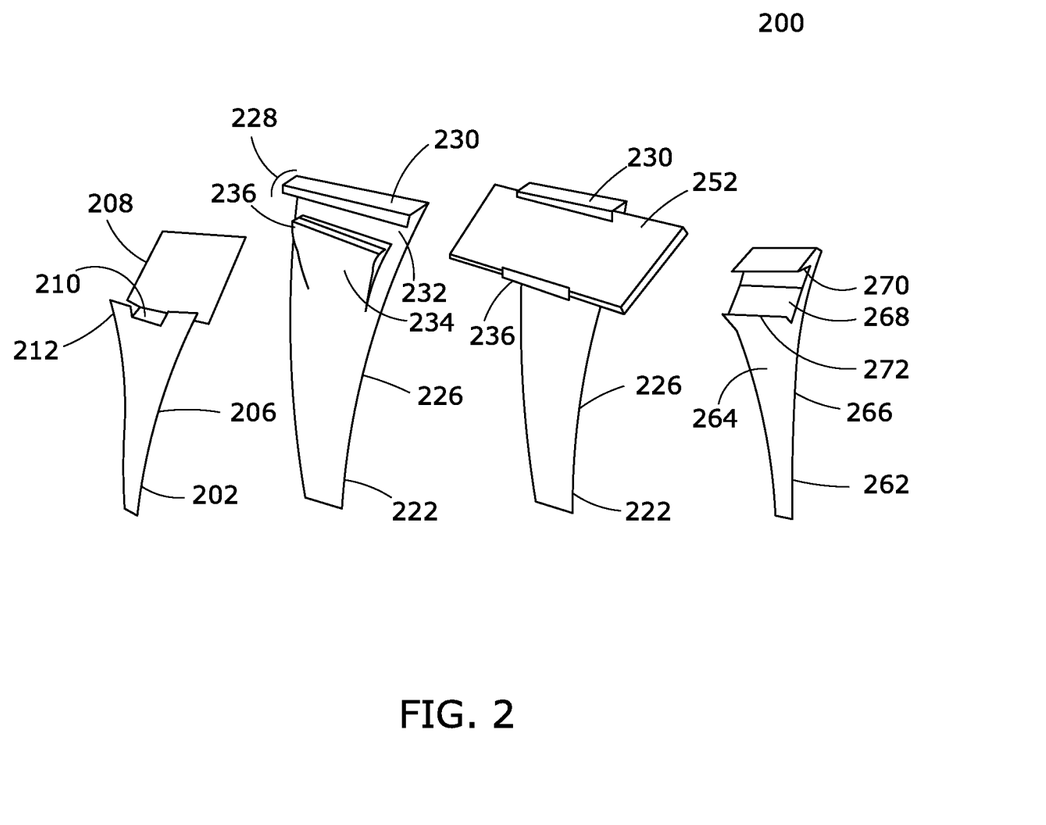
FIG. 2 illustrates second series of embodiments 200 of a mobile device holder.
Figure 3:
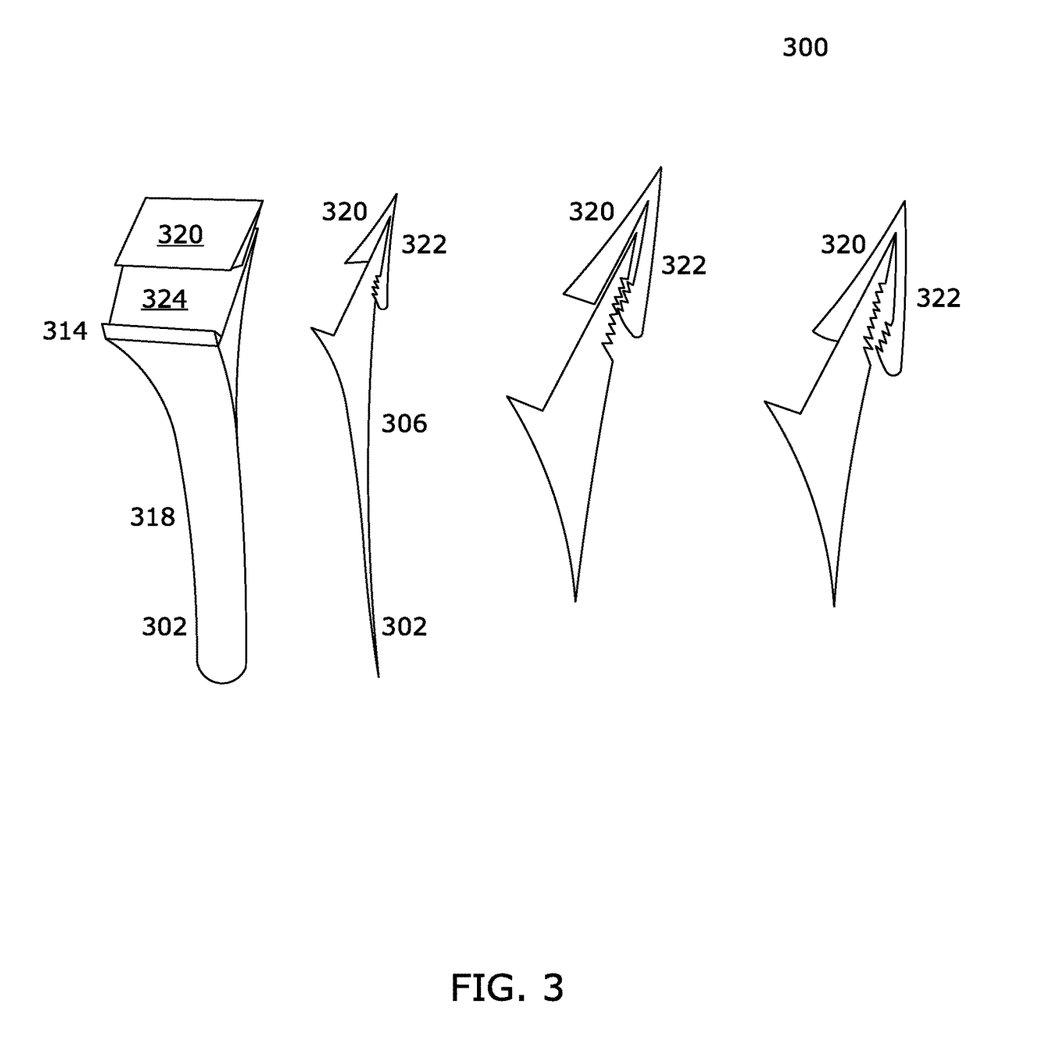
FIG. 3 illustrates third series of embodiments 300 of a mobile device holder.
Figure 4:
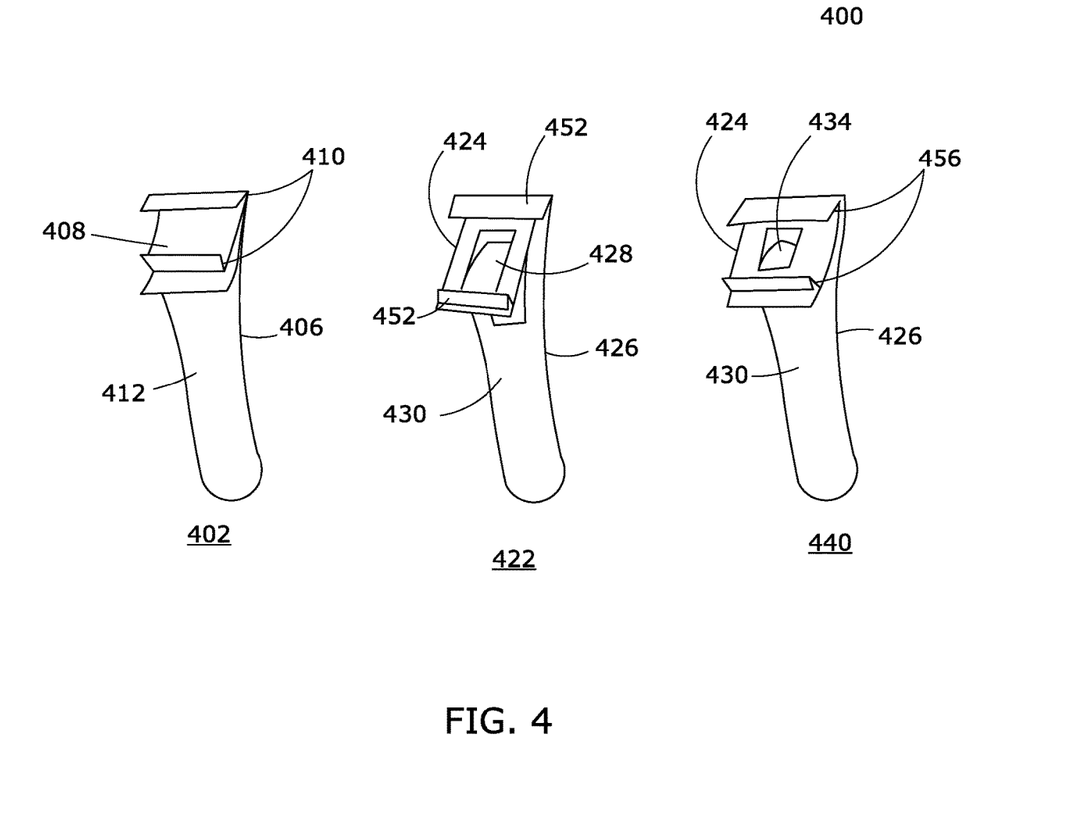
FIG. 4 illustrates fourth series of embodiments 400 of a mobile device holder.

In exemplary embodiments described in reference to FIGS. 2-4, aspects of the cell phone holders described in reference thereto having the same or similar features and/or functions as cell phone holder 102 are not reiterated. This is done solely to facilitate ease of understanding and is not to be taken as limiting in any way.

Turning to FIG. 2, a second series of embodiments 200 are disclosed in relation to other embodiments taught herein, namely of exemplary mobile device holders 202, 222 and 262.

Beginning with mobile device holder 202, the holder is an "easy fold" implementation. Mobile device holder 202 includes front arch region 212, back arch region 206, connection portion 210 and face region 208. In operation, the mobile device rests against face region 208. The connection portion 210 is sufficiently deformable to enable the traveler to push back face region 208 such that the mobile device rests within the connection portion 210. Upon release of face region 208, connection portion 210 deforms back to fit the mobile device snugly inside connection portion 210 with its back as against face region 208. Other features and functions of holder 202 are the same or similar to those described in reference to embodiment 100 or the other embodiments described herein.

With respect to the embodiments of device holder 222, the holder is a "retention grip" implementation. Mobile device holder 222 includes front arch region 234, lower flap 236, back arch region 226 and upper ridge portion 230. Upper ridge portion 230, in turn, comprises top flap 228 and lower lip portion 232. In operation, the mobile device 252 rests between upper ridge portion 230 (specifically, within its lower lip 232) and lower flap 236. The lower flap 236 and/or upper ridge portion 230 are sufficiently deformable to enable the traveler to push these regions open such that the mobile device rests between them as illustrated. Upon release of flap 236 and portion 230, these regions deform sufficiently back to fit the mobile device 252 snugly between them. Other features and functions of holder 222 are the same or similar to those described in reference to embodiment 100 or the other embodiments described herein.

With respect to the embodiments of device holder 262, the holder is in certain respects a "hybrid" of the "magnetic attach" and "retention grip" implementations, as shown above in relation to holders 102 and 222. Mobile device holder 262 includes front arch region 264 and back arch region 266. Holder 262 also includes face region 268, lower flap portion 272 and upper flap portion 270. In operation, the mobile device rests between lower flap portion 272 and upper flap portion 270. The lower flap portion 272 and/or upper flap portion 270 are sufficiently deformable to enable the traveler to push these regions open such that the mobile device rests between them. Upon release of flaps 272 and 270, these regions deform sufficiently back to fit the mobile device snugly between them. Other features and functions of holder 262 are the same or similar to those described in reference to embodiment 100 or the other embodiments described herein.

Turning to FIGS. 3 and 4, additional series of embodiments 300, 400 are disclosed in relation to other embodiments taught herein, namely of exemplary mobile device holders 302, 402 and 422.

In the embodiments of mobile device holder 302, the holder is a "ratchet tensioner" implementation. Mobile device holder 302 includes front arch region 318 and back arch region 306. Holder 302 also includes face region 324, lower ridge portion 314, upper flap portion 320 and rachet portion 322. In an exemplary embodiment, upper flap portion 320 and ratchet portion 322 are connected together in an autonomous unit. In operation, ratchet portion 322 connects with the upper region of back arch region 306. In a specific embodiment, the device is a screw-type of assembly wherein horizontal or semi-horizontal threads both on the ratchet portion 322 and on the upper region of back arch region 306 are disposed to latch against one another. Upon being pressed downward, the threads of ratchet portion 322 latch onto corresponding threads of the upper region of back arch region 306, until a locked position is achieved. In this position, the lower part of the mobile device rests on lower ridge portion 314, and the upper part of the mobile is made to snugly fit between upper flap portion 320 and face 324. For release of the mobile device, ratchet portion 322 may be displaced away from the upper region of back arch region 306, releasing the corresponding threads and permitting the autonomous portion (including items 320, 233) to be unlocked and removed. Other features and functions of holder 302 are the same or similar to those described in reference to embodiment 100 or the other embodiments described herein.

Turning to embodiment 400 of FIG. 4, exemplary mobile device holders 402 and 422 are illustrated. With respect to the embodiments of device holders 402, 422, the holder is in certain respects a "hybrid" of the foregoing implementations.

With respect to mobile device holder 402, the holder includes front arch region 412 and back arch region 406. Holder 402 also includes face region 408, and lower and upper flap portions 410. In operation, the mobile device rests between lower and upper flap portions 410. The lower and upper flap portions 410 are sufficiently deformable to enable the traveler to push these regions open such that the mobile device rests between them. Upon release of flaps 410, these regions deform sufficiently back to their original orientation to fit the mobile device snugly between them. Other features and functions of holder 262 are the same or similar to those described in reference to embodiment 100 or the other embodiments described herein.

With respect to holder 422, the holder includes a face region comprising flaps 424 and 428. The holder 422 also includes front arch region 430 and back arch region 426. In operation, the respective right and left lower parts of flap 428 are attached to flap 424, whereas flaps 424 and 428 are separate from each other at the upper portion of flap 428. This structure permits the traveler to push the upper portion of flap 428 inward, like a kickstand, such that the top edge of flap 428 comes to push against the inner, front surface of the mobile device (not shown) and the flap 428 itself rests in an orthogonal or nearly orthogonal position with respect to the surface. In the latter case, edge 452 of flap 428 turns upward to serve as a ridge supporting the bottom of the mobile device. In these embodiments, the device is immobilized by virtue of magnetic regions 452, which hold the mobile device in place via magnetic attraction with a piece of metal that is either attached to the back of the mobile device, itself, or included as part of or inside a case housing the mobile device.

With respect to mobile device holder 440, the holder similarly includes front arch region 430 and back arch region 426, and also a face region comprising flaps 424 and 434. Here, flap 434 comprises a middle portion of the face, whereas flap 424 comprises the remainder of the face region. This structure similarly permits the traveler to push flap 434 inward, like a kickstand, such that its top comes to push against the inner, front surface of the mobile device (not shown) and rests in an orthogonal or nearly orthogonal position with respect to the surface. In these embodiments, mobile device holder 440 is immobilized in the same or similar fashion as provided above with respect to mobile device 402, wherein upper and lower flap portions 456 are deformable to hold the mobile device in place between them.

Figure 5:
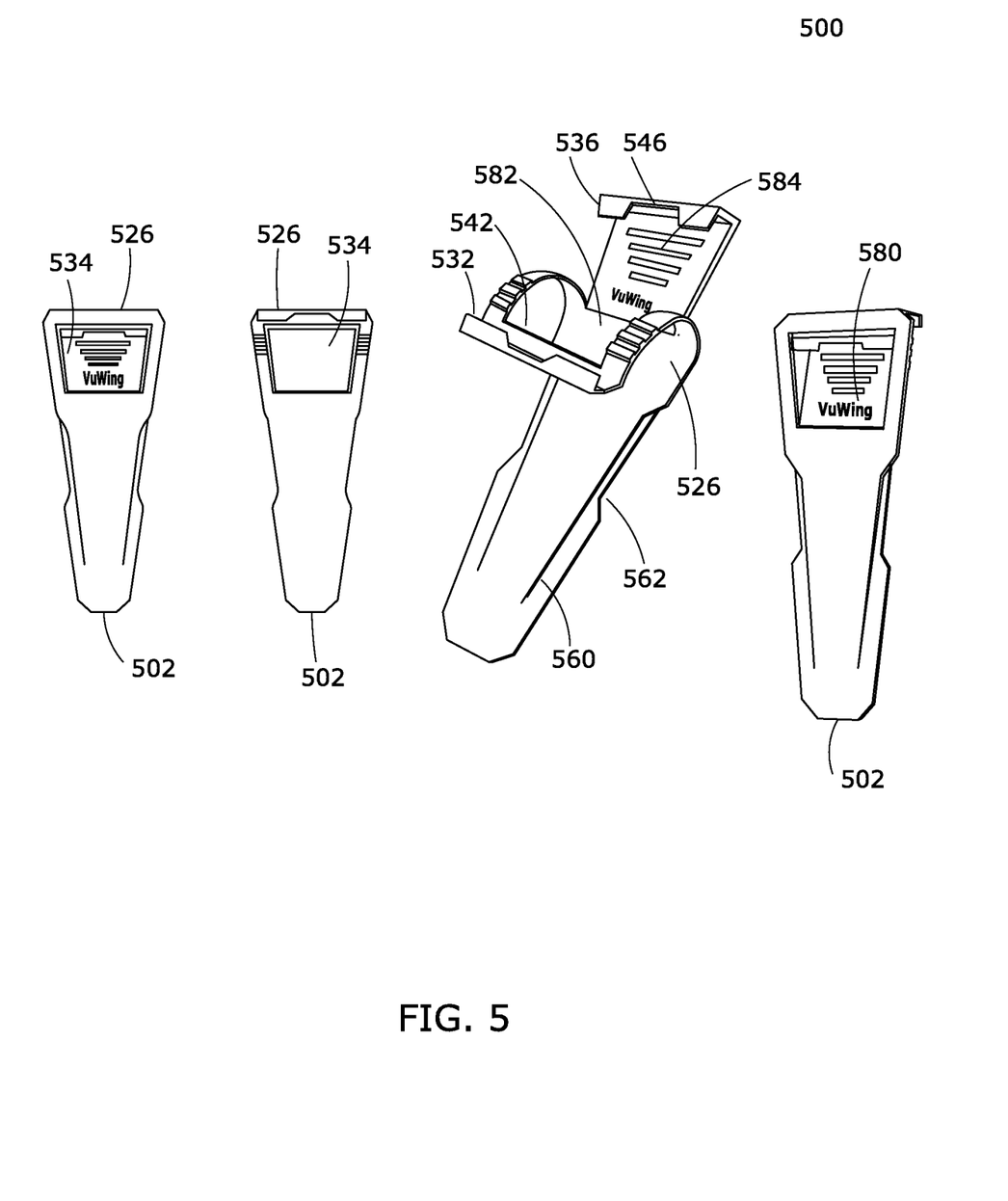
FIG. 5 illustrates a fifth series of embodiments comprising variations of certain embodiments associated with FIG. 2.

FIG. 5 provides exemplary embodiments 500. These embodiments are exemplary variation 502 of the embodiment of exemplary mobile device holder 222 (FIG. 2) is illustrated. The illustration provides four views of the same mobile device holder. With respect to the illustrated variation, mobile device holder 502 is another variation of a "retention grip" implementation of mobile device holder 222 (FIG. 2). In this embodiment and other alternative embodiments of the above, the respective regions need not be arched, as they are arched in certain variations and not arched in others. Mobile device holder 502 includes region 534 and region 526. Region 534 includes flap 536 and indented region 546. Region 526 includes flap 532 and indented region 542. Other additional, optional features include thickened and/or arched region 560 and recessed region 562.

In operation, the 502 variation differs from that of holder 222 in that it is the upper region 526 that is deformed downward, versus the lower region 234 in the mobile device holder 222 (FIG. 2) embodiment variation. Here, the mobile device 252 rests between flap 536 (of region 534) and flap 532 (of region 526). The flaps, including their respective ridges, are sufficiently deformable to enable the traveler to push these regions open such that the mobile device rests between them as illustrated. Upon release of the flaps, these regions deform sufficiently back to fit the mobile device 252 snugly between them. Other features and functions of this variation are the same or similar to those described in reference to embodiment 100 or the other embodiments described herein.

Figure 6:
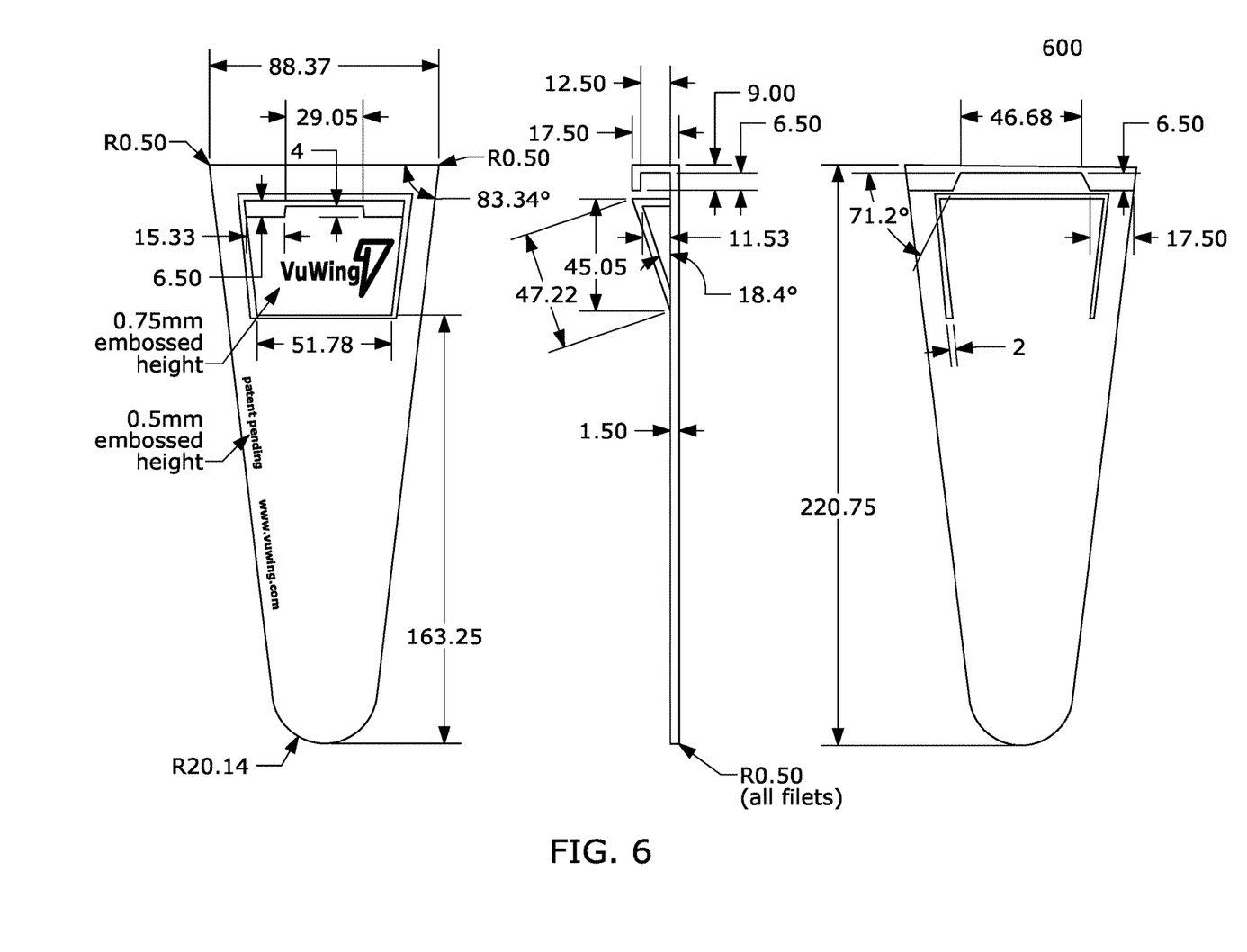
FIG. 6 illustrates exemplary dimensions of the FIG. 5 variations.

FIG. 6 provides exemplary measurements 600 of certain of the FIG. 5 variational embodiments.

It should be understood that this description is not intended to limit the embodiments. On the contrary, the embodiments are intended to cover alternatives, modifications, and equivalents, which are included in the spirit and scope of the embodiments. Further, in the detailed description of the embodiments, numerous specific details are set forth to provide a comprehensive understanding of the embodiments. However, one skilled in the art would understand that various embodiments can be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined or definable by the claims, and can include other examples that occur to those skilled in the art. Such other examples are intended to be within the scope of the claims.

The above-described embodiments are intended to be illustrative in all respects, rather than restrictive, of the embodiments. Thus, the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

All United States patents and applications, foreign patents, and publications discussed above, if any, are hereby incorporated herein by reference in their respective entireties.

I claim:

1. A mobile device holding means for holding a mobile device on a mode of transportation, comprising:
   a frame comprising a first end and a second end;
   the first end comprising securing means for maintaining the mobile device in a substantially stationary position with respect to the mode of transportation;
   the second end comprising a mobile device fastening means, said mobile device fastening means comprising:
   a first element comprising a first portion of the second end;
   a second element comprising a second portion of the second end; and
   an attachment element comprising an area of contact between the first element and the second element, wherein
   the attachment element is disposed to permit placement of a mobile device between the first element and the second element, and is further disposed to permit the mobile device to be held in a substantially locked position between the first element and the second element, and further wherein the fastening means comprises a plurality of deforming means disposed to deform to open, accept, and retain the mobile device in a substantially immobile manner; and the mode of transportation includes a pocket of a seat thereon disposed to hold written documents, and wherein the securing means contacts said pocket.

2. The mobile device holding means of claim 1, wherein the securing means comprises at least one of:
   a substantially elongated structure of the first end; a tacky coating on an external surface of the first end; a raised portion of the first end; and an arched portion of at least one of the first end and the second end.

3. The mobile device holding means of claim 1, wherein the mode of transportation comprises at least one of:
   a powered flying vehicle; a powered railroad vehicle; and a powered road vehicle.

4. The mobile device holding means of claim 1, wherein the mobile device fastening means further comprises:
   a magnetic element disposed to magnetically couple any one of the first element and the second element to one or more pieces of metal associated with the mobile device.

5. The apparatus of claim 1, wherein at least one of said first element, said second element and said attachment element is made up of a material comprising at least in part a polymer, said polymer comprising at least one of:
   Silicones;
   Polysiloxanes; and
   Thermoplastic Elastomers.

6. The apparatus of claim 1, wherein at least one of said first element, said second element and said attachment element is made up of a material comprising at least in part a plastic, said plastic comprising at least one of:
   Polyethylene terephthalate (PETE, PET);
   Polyethylene (PE); Polyvinyl Chloride (PVC); Polypropylene (PP);
   Polystyrene;
   Polylactic Acid (PLA);
   Polycarbonate (PC);
   Acrylic (PMMC);
   Acetal (polyoxymethylene, POM); Nylon (PA); and Acrylonotrile Butadiene Styrene.

7. The apparatus of claim 1, wherein the mobile device comprises any one of:
- a cell phone;
- a smartphone;
- a tablet; and
- a mobile accessory device.

8. A mobile device holder for holding a mobile device in a mode of transportation, comprising:
- an elongated body comprising a proximate portion and a distal portion opposite to said proximate portion;
- the distal portion connected to the elongated body at a part thereof being distal to a holding portion, said distal portion being enabled to snugly fit in a pocket of the mode of transportation;
- the proximate portion connected to the elongated body at a part thereof being proximate to the holding portion;
- the holding portion comprising:
  - a first deformable region being disposed to hold a first side of the mobile device; and
  - a second deformable region being disposed to hold a second side of the mobile device, wherein
    - upon deformation of any one of said first and second deformable regions from the other of said first and second deformable regions to permit sufficient room for holding of the mobile device in-place, said first and second deformable regions are disposed to deform back to their original respective forms sufficiently to snugly fit the mobile device in-place at said first and second sides of the mobile device.

9. The mobile device holder of claim 8, wherein the distal portion comprises at least one of:
- a substantially elongated structure thereof;
- a tacky coating on an external surface thereof;
- a raised portion thereof; and
- an arched portion of at least one of the distal portion and the proximate portion.

10. The mobile device holder of claim 8, wherein the holding portion further comprises:
- means for housing a magnetic element disposed to magnetically couple any one of the first deformable region and the second deformable region to one or more pieces of metal associated with the mobile device.

11. The mobile device holder of claim 8, wherein the mode of transportation comprises at least one of:
- a powered flying vehicle;
- a powered railroad vehicle; and
- a powered road vehicle, and wherein the pocket is attached to a seat thereon and disposed to hold written materials.

12. The mobile device holder of claim 8, wherein at least one of the first deformable region and the second deformable region is made up of a material comprising at least in part a polymer, said polymer comprising at least one of:
- Silicones;
- Polysiloxanes; and
- Thermoplastic Elastomers.

13. The mobile device holder of claim 8, wherein at least one of the first deformable region and the second deformable region is made up of a material comprising at least in part a plastic, said plastic comprising at least one of:
- Polyethylene terephthalate (PETE, PET);
- Polyethylene (PE);
- Polyvinyl Chloride (PVC);
- Polypropylene (PP);
- Polystyrene;
- Polylactic Acid (PLA);
- Polycarbonate (PC);
- Acrylic (PMMC);
- Acetal (polyoxymethylene, POM);
- Nylon (PA); and
- Acrylonotrile Butadiene Styrene.

14. The apparatus of claim 8, wherein the mobile device comprises any one of:
- a cell phone;
- a smartphone;
- a tablet; and
- a mobile accessory device.

15. An apparatus for holding a mobile device stationary within a pocket affixed to one or more elements of a mode of transportation, the apparatus comprising:
- a holding portion embodied to fasten the apparatus to the mobile device in a substantially fixed fashion; and
- an extended portion disposed to fasten the apparatus to the pocket in a substantially fixed fashion, wherein the holding portion comprises:
  - a first deformable region being disposed to hold a first side of the mobile device; and
  - a second deformable region being disposed to hold a second side of the mobile device, wherein
- upon deformation of any one of said first and second deformable regions from the other of said first and second deformable regions to permit sufficient room for holding of the mobile device in-place, said first and second deformable regions are disposed to deform back to their original respective forms sufficiently to snugly fit the mobile device in-place at said first and second sides of the mobile device.

16. The apparatus according to claim 15, wherein the extended portion is disposed to enable the mobile device to snugly fit in the pocket.

17. The apparatus according to claim 15, wherein the holding portion is further disposed to contain a magnetic element disposed to magnetically couple any one of the first deformable region and the second deformable region to one or more pieces of metal associated with the mobile device.

18. The apparatus according to claim 15, wherein the extended portion comprises at least one of:
- a substantially elongated structure thereof;
- a tacky coating on an external surface thereof;
- a raised portion thereof; and
- an arched portion of at least one of the holding portion and the extended portion.

* * * * *